WALTER J. KRUPICK
WILLIAM J. LEWIS
INVENTORS

WALTER J. KRUPICK
WILLIAM J. LEWIS
INVENTORS

BY Andrew L. Bain

ATTORNEYS

May 12, 1964 W. J. KRUPICK ETAL 3,132,521
COMPACT INERTIAL-DAMPED SINGLE-AXIS ACCELEROMETER
Filed June 24, 1960 4 Sheets-Sheet 3

WALTER J. KRUPICK
WILLIAM S. LEWIS
INVENTORS

BY Andrew L. Bain

ATTORNEYS

WALTER J. KRUPICK
WILLIAM J. LEWIS
INVENTORS

ATTORNEYS

3,132,521
COMPACT INERTIAL-DAMPED SINGLE-AXIS
ACCELEROMETER
Walter J. Krupick, Franklin, N.J., and William J. Lewis, Wayzata, Minn., assignors to General Precision, Inc., Little Falls, N.J., a corporation of Delaware
Filed June 24, 1960, Ser. No. 38,512
3 Claims. (Cl. 73—517)

This invention relates to accelerometers and is directed particularly to a compact accelerometer constructed to operate within a preferred plane and to respond substantially only to forces along a predetermined axis in that plane, which may be selected in any direction.

Accelerometers of the general type to which the present invention pertains are disclosed and claimed in U.S. Patent No. 2,985,021. Such accelerometers embody an inertial mass in the form of a pendulum which responds and generates an electrical signal proportional to the acceleration to which the unit is subjected.

The primary object of this invention is to provide a compact, highly-sensitive accelerometer that will respond to external accelerating forces operating in either direction along a predetermined axis.

Another object of the invention is to provide a compact accelerometer of the foregoing type having a simple construction which permits an extremely fine adjustment to compensate for small mechanical deviations from an ideal relation of balance due to variations within even a small range of manufacturing tolerances.

A further object of the invention is to provide a novel accelerometer employing a relatively short pendulum having a simple, unique supporting structure that permits it to be very accurately and sensitively positioned with respect to an adjusted virtual pivot line, together with relatively simple means for suitably balancing and biasing the pendulum to align its physical axis with a virtual ideal inertial axis to compensate for the force of gravity, depending upon whether the accelerometer is disposed and used to measure forces in a vertical (gravity) axis or along some other selected axis.

An accelerometer constructed in accordance with the principles of this invention comprises generally a pivoted substantially cylindrical arm pivotally mounted at one end and longitudinally aligned with a main inertial axis; the free end of the arm carries a pick-off signal coil and a pair of restoring coils. A shield magnet or magnetic isolator is provided having projections inserted through a series of openings through the support for the restoring coils. The signal coil is disposed to be movable in an air-gap traversed by a magnetic field from suitable exciting coils whereby movement of the pick-off signal coil will induce a voltage signal that may be utilized externally for indication, measurement or control purposes.

In order to permit the accelerometer to respond instantaneously to external forces, the accelerometer is provided with electro-magnetic torquer means consisting of a pair of restoring coils and a permanent magnet having a plurality of radial segments inserted through openings in the support for the restoring coils; the restoring coils apply forces resisting displacement of the pendulum from its neutral position.

When the accelerometer is used to measure a horizontal force, the pendulum is disposed in vertical position, accurately adjusted for balance, so the movement of the free end will be in a horizontal line and utilized to indicate the presence of a horizontal force to be detected.

When the accelerometer is to measure a vertical force, the pendulum is disposed with its axis in a horizontal position. The simple sensitive adjusting means permits the physical axis of the pendulum to be adjusted very accurately to a position exactly perpendicular to the gravity axis. In such use, the pendulum is necessarily supported as a cantilever. For accuracy or response, its cantilever weight is additionally balanced electromagnetically to position the physical axis properly in true horizontal position.

The construction of an accelerometer made in accordance with the principles of this invention is illustrated in the accompanying drawings, in which.

Figure 1:
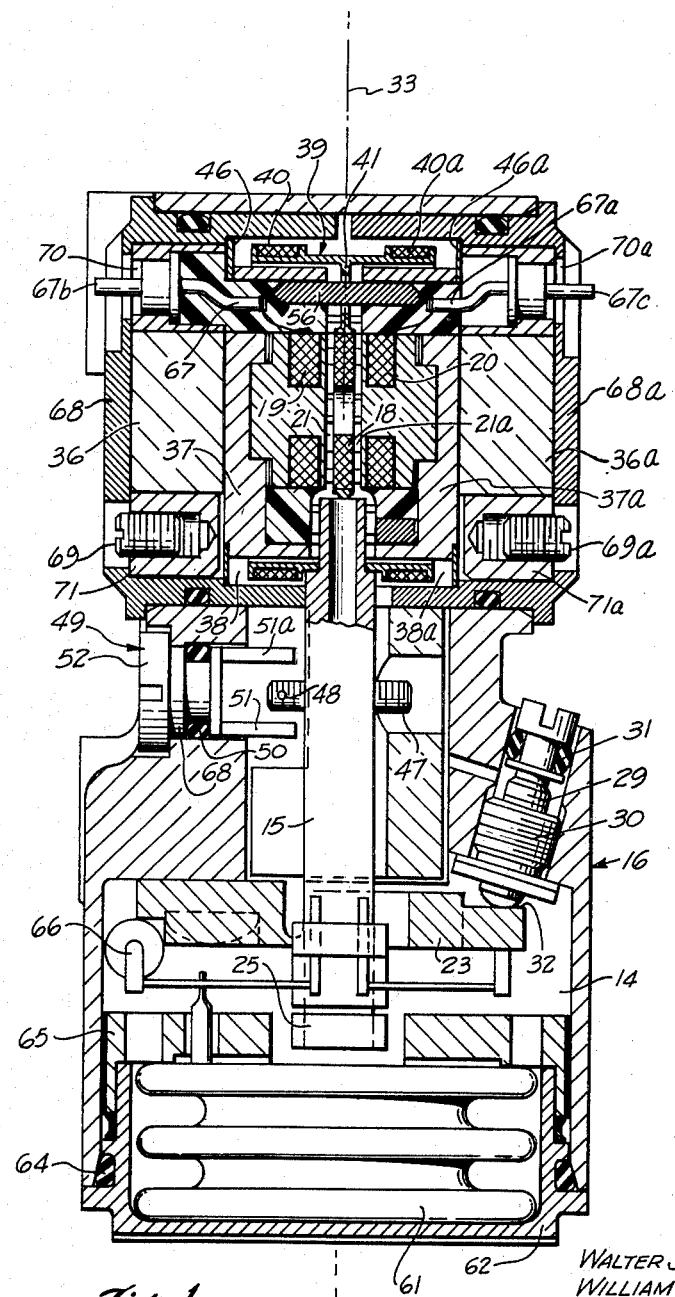
FIGURE 1 is a longitudinal section through an accelerometer embodying the present invention disposed for sensing accelerations in a horizontal plane, the section being taken along line 1—1 of FIGURE 2.

It will be understood that the following description of the construction and the method of mounting, attachment, operation and utilization of the compact single axis accelerometer is intended as explanatory of the invention and not restrictive thereof.

In the drawings, the same reference numerals designate the same parts throughout the various views, except where otherwise indicated.

Figure 3:
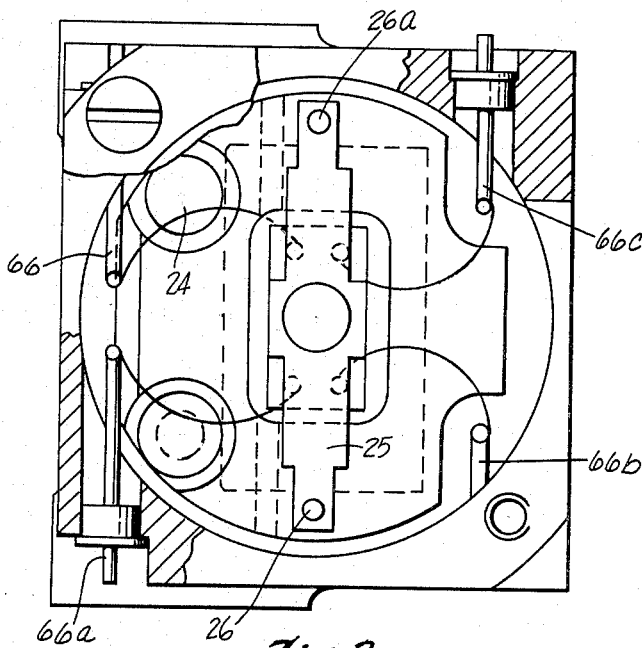
FIGURE 3 is a bottom view, partially in cross-section, of the accelerometer shown in FIGURE 1 with parts omitted to show underlying structure.
Figure 2:
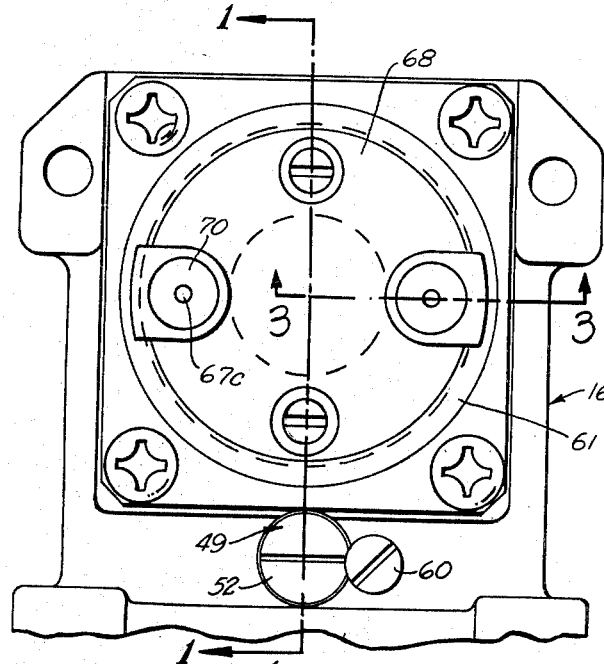
FIGURE 2 is a fragmentary elevational view of the upper portion of the accelerometer as indicated by line 2—2 in FIGURE 1.
Figure 9:
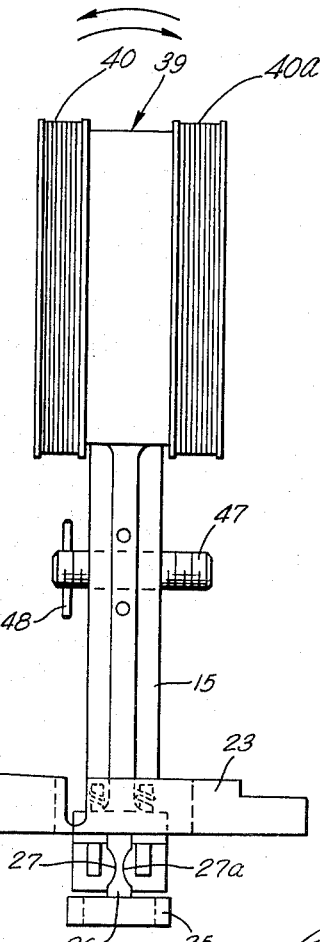
FIGURE 9 is a front elevational view of the pendulum shown in FIGURE 1, showing additional details of its pivotal mounting.

One embodiment of the invention, shown in FIGURES 1, 2 and 3, consists essentially of a pendulum 15, which is a substantially cylindrical member pivotally supported within a housing 16, in such a manner as to enable it to move angularly about a pivot mounting located at the lower end of pendulum, the upper portion of the pendulum being movable through an arc in the plane of FIGURE 1, as indicated by the arrows in FIGURE 9.

The upper end of pendulum 15 carries a pick-off coil 18, which is located in an air gap 21 between a pair of excitation or field coils 19, 20 supported within housing 16; displacement of the pick-off coil relative to the excitation coils generates a signal indicative of angular position of pendulum 15 in a manner hereinafter described.

Figure 10:
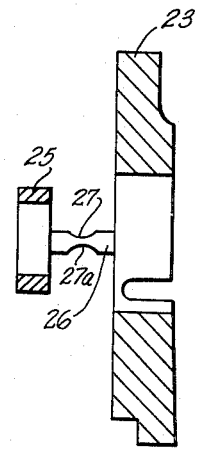
FIGURE 10 is a vertical section through the pivotal mounting shown in FIGURE 9.
Figure 12:
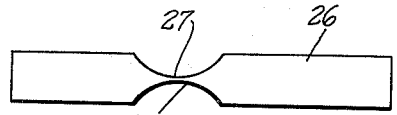
FIGURE 12 is an enlarged front elevational view of one of the elements shown in FIGURES 10 and 11.
Figure 11:
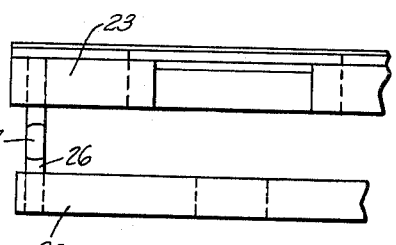
FIGURE 11 is a fragmentary elevational view of the structure shown in FIGURE 10.

The pendulum 15 is supported by a plate 23, which is adjustably attached to the upper face bottom wall of a counterbore 14 formed in the housing 16, by a plurality of screws 24, shown in FIGURE 3, the lower end of the cylindrical section of the pendulum being fixedly attached to a long pivot bar 25, shown in FIGURES 1, 10 and 11, which is integral with, or attached to, the plate by a pair of pivot pins 26, 26a, shown in detail in FIGURES 10, 11 and 12, each of the pivot pins having a pair of notched flexure sections 27, as shown in FIGURES 10 and 12, formed therein, the notched flexure sections enabling the pendulum to be angularly displaced in the plane of FIGURE 1, the pendulum being rigidly supported in a plane perpendicular to the plane of FIGURE 1.

The flexure pivot pins may be made of a relatively hard material, such as Cobenium, or Elgalloy, which is an alloy originally made by the Elgin Watch Co., or the like.

The notched flexure sections of the pivot pins 26, 26a are reduced to a very small thickness dimension, e.g. of the order of 0.00060.

The pivot pins are usually machined down to a thickness, which is close to the required thickness, after which the notched sections 27, 27a are lapped in pairs to attain uniformity of thickness and equal spacing relative to the axes of the two pivot pins.

In order to adjust the initial or null angular position of the pendulum, an adjusting screw 29, which is angularly positioned relative to the axis of the pendulum is inserted through an opening in the housing 16, the body of the adjusting screw being threadably fitted to a headed bushing 30, which is threadably fitted to the inner end of the opening through the housing wall.

The outer end of the adjusting screw 29 under the head thereof has an O-ring 31, or other type of compressible seal ring, fitted thereto, to seal the interior of the opening. In order to adjust the initial angular position of the pendulum 15, the tip of the adjusting screw 29 engages surface 32, formed at one side of the upper face of the support plate, the surface of the plate being nominally substantially perpendicular to the axis of the adjusting screw 29. Thus, when the adjusting screw is moved toward the support plate 23, it tilts the axis of the pendulum in an angularly rightward direction, outward movement of the adjusting screw 29, tilting the pendulum in the opposite direction.

In the normal neutral position of the accelerometer, shown in FIGURE 1, the physical axis 33, of the pendulum 15 coincides with the inertial axis 34 of the accelerometer. This alignment of the axes 33, 34 may be established by means of the pendulum, by tilting the support plate.

When the upper end of the pendulum 15 is angularly displaced, a torquer unit such as that shown at the upper end of FIGURE 1 is provided to restore the free end of the pendulum to its neutral position. The torquer unit consists of two electromagnetic assemblies, each of which consists of a permanent magnet 36, 36a with a corresponding magnetic core structure, consisting of a cylindrical plate member 37, 37a, and a pair of cupped end caps 68, 68a, having an annular space or air gap 38, 38a formed therein.

Figure 4:
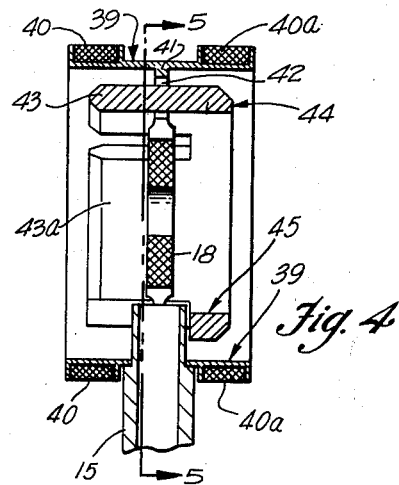
FIGURE 4 is a fragmentary section with the plane of FIGURE 1, showing the free end of the pendulum, the restoring coils, and one embodiment of the magnetic isolator.

As shown in FIGURES 1 and 4, a tubular coil support 39 is fixedly attached to the free end of the pendulum 15 on opposite sides of the pendulum cylinder. Each end of the coil support 39 fits into one of the annular air gaps 38, 38a and each coil support supports a pair of restoring coils 40, 40a which are suitably energized to react with the flux field across the corresponding air gap 38, 38a between the circumferential outer surface of the plate member 37, 37a and the circumferential inner surface of the tubular section of each of the end caps 68, 68a, to produce the desired restoring forces for the pendulum for the purpose hereinafter described.

Figure 5:
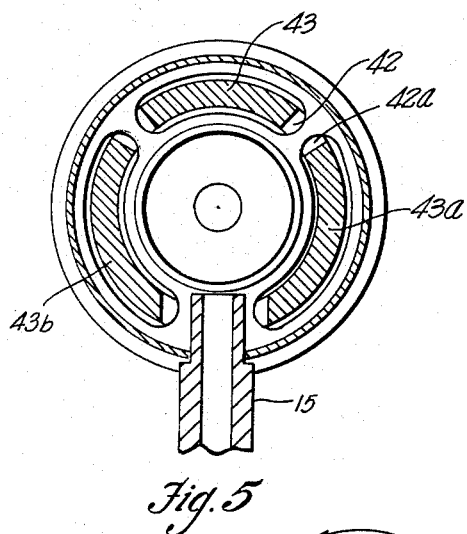
FIGURE 5 is a view and taken on line 5—5 in FIGURE 4 looking in the direction of the arrows.

As shown in FIGURES 4 and 5, each coil support has a central web 41 integral therewith, and aligned with the axis of the pendulum body. The central web has a plurality of circular segmental slots 42, 42a therethrough adapted to receive the mating projecting legs 43, 43a of a magnetic isolator 44.

Magnetic isolator 44 consists of a tubular body 45 having three or more projecting legs 43, 43a, 43b, integral therewith; the legs, of circular segmental cross-section, are inserted through respective slots 42, 42a in the manner hereinbefore described.

The primary purpose of the magnetic isolator 44 is to separate the flux fields formed by the A.C. current in the restoring coils 40, 40a from the flux fields formed by the A.C. current fed to the exciter coils 19, 20 and shield the pick-off coil 18 from any stray magnetic fields set up by the A.C. current through the restoring coils.

For the ideal operation, the current supplied to the restoring coils 40, 40a would be pure D.C.; however, due to the demodulator device in the associated capture amplifier, an A.C. ripple voltage is imposed across the restoring coils 40, 40a.

Each of the coils 40, 40a provides a restoring force resisting angular displacement of the pendulum from its neutral position by acceleration forces.

As regards the torquer unit, proper flux fields across the air gaps 38, 38a are established by the provision of suitable magnetic shunts. One shunt is shown as an annular ring or washer 46, 46a supported by each of the magnet shells 37, 37a and located at the outer end of each airgap 38, 38a.

Figure 8:
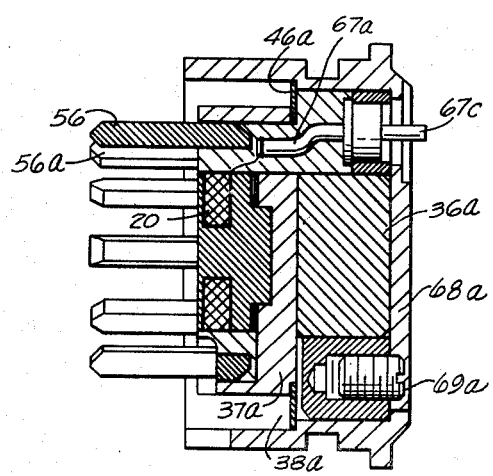
FIGURE 8 is a fragmentary section through one side of the upper portion of the structure shown in FIGURE 1, showing the magnetic isolator of FIGURES 6 and 7 and its relation to the excitation coils.

Additional adjusting means is provided by the magnetic shunts 69, 69a, shown in FIGURES 1 and 8, each of which is threadably inserted in an annular ring 71, 71a, which is fitted to the interior of one of the cupped end caps 68, 68a. Each permanent magnet 36, 36a is fitted to and supported by one of the annular rings 71, 71a. These screws provide a shorter flux path for the magnetic circuit. Consequently, by means of adjusting these screws inward or outward, a change in the flux density across the air gaps 38, 38a is attained.

As shown in FIGURE 1, an adjusting screw 47 threadably fitted to the cylindrical body of the pendulum 15 and substantially perpendicular to the longitudinal axis thereof, is provided to adjust the lateral position of the center of gravity of the body of the pendulum. Adjusting screw 15 carries a transverse pin 48, to facilitate adjustment from the outside of the housing which is accomplished by means of a control screw 49 inserted through a cylindrical opening through the housing 16 and sealed therein by an O-ring 50 or the like.

Substantially parallel prongs 51, 51a on the inner end of control screw 49 engages the projecting ends of transverse 48 to enable rotation of adjusting screw 47 by rotating the control screw 49. The head 52 of the control screw is held in place (after adjustment) by an auxiliary locking screw 60 threadably fitted to the outer wall of the housing 16, as shown in FIGURE 2.

Figure 7:
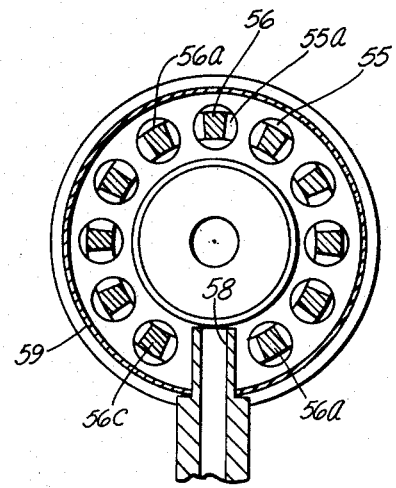
FIGURE 7 is a view taken on line 7—7 in FIGURE 6 looking in the direction of the arrows.
Figure 6:
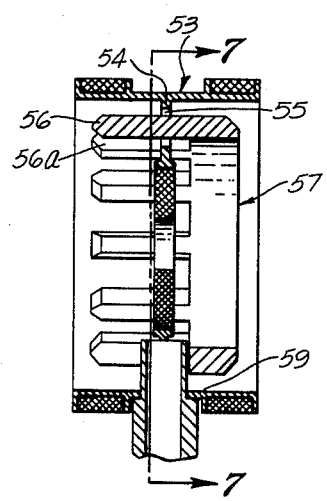
FIGURE 6 is a vertical section, similar to FIGURE 4, through the free end of the pendulum showing a modification of the magnetic isolator.

FIGURES 6, 7 and 8 show a modification of the coil support shown in FIGURES 4 and 5 and a modification of the magnetic isolator, which is fitted thereto. The modified coil support 53 includes a central web 54 which is similar to that shown in FIGURE 4. The central web has a series of equally-spaced circular or oval-shaped openings 55, 55a therethrough, each adapted to receive one leg 56, 56a of a modified magnetic isolator 57, which is substantially the same as that shown in FIGURE 4 except that it has a larger number of relatively narrow legs 56, 56a integral therewith.

The spacing between the lower legs 56a, 56c of the magnetic isolator is greater than between other pairs thereof to clear a reduced diameter stem 58, which is integral with the upper end of the body of the pendulum, the stem being inserted through an opening in the circumferential outer surface 59 of the tubular coil support 53, which is pressed on, soldered or otherwise attached to the stem 58.

The operation of the magnetic isolator of FIGURES 6, 7 and 8 is substantially the same as that shown in FIGURES 4 and 5.

In operation, the signal from the pick-off coil 18 is amplified by a suitable amplifier (not shown), sent through the selected restoring coil 40, 40a of the accelerometer, thence through a resistor (not shown) to the torquer coil or other element in the platform system (not shown) in which the accelerometer hereinbefore described is used.

In order to damp the oscillations of the pendulum 15, the entire interior of the housing is filled with a suitable damping fluid, such as a silicone composition, or other suitable damping fluid.

Reverting to FIGURE 1, a sealed expansible cylindrical corrugated bellows 61, filled with helium or other light gas to about one atmosphere, is fitted to the interior of the housing 16, below the support plate 23 and the pivot bar 25 to which the pendulum 15 is attached. The bellows is supported by a cup-shaped cap 62, which is fitted to the counterbored lower end of the housing 16 and sealed with an O-ring 64 or the like. A hollow cupped cylindrical sleeve 65 is fitted to the upper end of the bellows and slidably fitted to the counterbored interior of the housing.

With the type of damping fluid above specified and the type of bellows hereinbefore described, the accelerometer will operate at temperatures up to 200° F. without difficulty. Normally the operating temperature is of the order of 155° F. Thus, when the temperature increases, the damping fluid in the housing 16 expands, moving the cylindrical sleeve 65 toward the bottom of the housing, thereby reducing the height of the bellows and providing additional space for the expanded damping fluid. This would be accompanied by a slight increase in the pressure of the gas within the bellows and, therefore, the pressure of the damping fluid against the cupped sleeve 65.

In order to transmit current to and from the pick-off coils 19, 20 and restoring coils 40, 40a through the pendulum, terminals 66, 66a, 66b, 66c are fitted to the lower portion of the housing adjacent the support plate 23 as shown in FIGURES 1 and 3. Similar terminals 67, 67a are fitted to the upper end of the case to provide the current for the excitation coils 19, 20. These terminals are connected by leads 67b, 67c, which extend through openings 70, 70a or cavities cut through the outer walls of the cupped end caps 68, 68a inserted through openings in the upper end of the housing 16.

It will be apparent to those skilled in the art, that the present invention is not limited to the specific details described above and shown in the drawings, and that various modifications are possible in carrying out the features of the invention and the operation and the method of support, mounting adjustment and utilization thereof, without departing from the spirit and scope of the appended claims.

What is claimed is:

1. A miniature single axis accelerometer, comprising a housing having a first cavity therein, in the direction of a predetermined longitudinal inertial axis, said housing having an auxiliary cavity therein, aligned with the first cavity; a support plate adjustably attached to the housing, within the auxiliary cavity; a floating cross-bar, spacedly located relative to the support plate; means resiliently supporting the floating cross-bar from the support plate, consisting of two spaced connectors between the respective ends of the cross-bar and the support plate; a pendulous arm having one end secured to the cross-bar and its free end extending away from the cross-bar, the longitudinal physical axis of the pendulous arm being substantially parallel to said longitudinal inertial axis; signal-inducing means controlled by the free end of said pendulous arm to induce a signal voltage in response to an external force operating on the free end of the pendulous arm; means threadably fitted to the housing adapted to engage the adjacent surface of the support plate, to adjustably tilt the support plate, to correspondingly tilt the cross-bar, and the pendulous arm, thereby to establish desired substantial parallelism between the longitudinal physical axis of the pendulous arm and said longitudinal inertial axis; and electro-magnetic means to establish a force to restore the longitudinal physical axis of the pendulous arm to its neutral position substantially parallel to the longitudinal inertial axis, including a tubular coil support member attached to the free end of the pendulous arm, said tubular coil support member having a central web integral therewith and substantially perpendicular to the central longitudinal axis of the coil support member, said central web having a plurality of radially equally-spaced openings therethrough, a pair of restoring coils coaxially disposed on the tubular coil support member, and a magnetic isolator of hollow cylindrical configuration fixedly mounted in said first cavity substantially co-axially within the restoring coils, and circumscribing said signal-inducing means, said magnetic isolator having a plurality of legs integral therewith, the legs being radially aligned with the openings through the central web of the tubular coil support member, said legs being substantially parallel to the central longitudinal axis of the tubular coil support member, said magnetic isolator being adapted to shield the signal-inducing means attached to the pendulous arm from any stray AC magnetic fields set up by the current through the restoring coils.

2. A miniature single axis accelerometer to be disposed to operate in response to forces along a predetermined force axis, and disposed with its longitudinal physical axis substantially parallel to an inertial longitudinal axis orthogonal to the force axis, said accelerometer comprising a housing having a first cavity therein in substantial alignment with the inertial longitudinal axis, said housing having an auxiliary cavity therein, axially aligned with the first cavity, a support plate adjustably attached to the housing, within the auxiliary cavity, a pendulous arm having a pivotal end and a free end spaced from the pivotal end, both ends locating the longitudinal physical axis of such arm in substantial alignment with the longitudinal inertial axis of the accelerometer; a coil supported on the free end of the pendulous arm, said coil serving as the means for generating a signal voltage; stationary coil means adjacent the signal coil and serving, when energized, to establish a magnetic flux field in the path of movement of the movable coil; and dynamo-electric means supported from the housing structure and disposed transversely of the free end of the pendulous arm and serving upon energization, to apply a restoring torque to the pendulous arm to restore the longitudinal physical axis of the pendulous arm to its neutral position in substantial alignment with the longitudinal inertial axis, said dynamo-electric restoring means including a stationary permanent magnet stator structure supported in and secured to the housing, and disposed to define an air gap to locate a magnetic flux field, a movable coil disposed in the air gap and supported on a physical element secured to the free end of the pendulous arm whereby such movable coil when energized by an applied current, will be moved in said air gap, by reaction of the coil flux and the air gap flux field, to apply a restoring torque to the free end of the pendulous arm; and resilient means supporting the pivotal end of the pendulous arm from the support plate attached to the housing, said supporting means including a floating bar secured to the pivotal end of the pendulous arm transversely to the longitudinal physical axis thereof, and a resilient connector between each end of the floating bar and the corresponding end of the support plate, said dynamo-electric means including a tubular coil support member, attached to the free end of the pendulous arm, the central longitudinal axis of the tubular coil support member being substantially perpendicular to the longitudinal physical axis of the pendulous arm, said tubular coil support member having a web integral therewith, and substantially perpendicular to the central longitudinal axis of the coil support member, said web having a plurality of radially equally-spaced openings therethrough, a pair of restoring coils mounted on the tubular coil support member coaxially therewith, and a magnetic isolator of hollow cylindrical configuration fixedly mounted in said first cavity substantially co-axially within the restoring coils and circumscribing said stator structure and movable coil, said magnetic isolator having a plurality of legs integral therewith, the legs being radially aligned with the openings through the web of the tubular coil support member, said legs being substantially parallel to the central longitudinal axis of the tubular coil support member, said magnetic isolator being adapted to shield the signal voltage generating coil attached to the free end of the pendulous arm from any stray magnetic fields set up by the current through the restoring coils.

3. An accelerometer to be disposed to operate in response to forces along a predetermined force axis, and disposed with its longitudinal physical axis substantially parallel to an inertial longitudinal axis orthogonal to the force axis, said accelerometer comprising, a housing having a first cavity therethrough in substantial axial alignment with the inertial longitudinal axis, the housing having an auxiliary cavity therein, axially aligned with the first cavity, a support plate adjustably attached to the housing within the auxiliary cavity, a pendulous arm having a pivotal end and a free end spaced from the pivoted end, both ends locating the longitudinal physical axis of such pendulous arm substantially parallel to the inertial axis of the accelerometer; means supported on, and controlled by the movement of the free end of the pendulous arm for generating a signal voltage; stationary coil means adjacent the signal coil and serving when energized, to establish a magnetic flux field in the path of movement of the movable signal generating means, and dynamo-electric means supported by the housing, and disposed transversely of the free end of the pendulous arm, and serving, upon energization, to apply a restoring torque to the pendulous arm to restore the longitudinal physical axis of the pendulous arm to a neutral position substantially parallel to the longitudinal inertial axis said dynamo-electric restoring means including a stationary permanent magnet stator structure supported in and secured to the housing and disposed to define an air gap to locate a magnetic flux field, a movable coil disposed in the air gap and supported on a physical element and secured to the free end of the pendulous arm, whereby such movable coil, when energized by an applied current, will be moved in said air gap by reaction of the coil flux and the air gap flux field, to apply a restoring torque to the free end at the pendulous arm, a resilient means supporting the pivotal end of the pendulous arm from said support plate, said resilient supporting means including a floating bar secured to the pivotal end of the pendulous arm transversely to the longitudinal physical axis thereof, and a resilient connector between each end of the floating bar and the corresponding end of the support plate, said resilient means supporting the pivoted end of the pendulous arm being attached to the floating bar and the support plate, respectively, and means for adjustably tilting the support plate and the floating bar to adjustably tilt the pendulous arm to a balanced neutral position to establish substantial parallelism between the longitudinal physical axis of the pendulous arm and the longitudinal inertial axis of the accelerometer, the means for adjustably tilting the floating bar consisting of a substantially cylindrical threaded member, threadably fitted to the housing, said threaded member being angularly disposed relative to the support plate, said threaded member being adapted to engage one end of the support plate, thereby to tilt the support plate and the pendulous arm supported hereby, said dynamo-electric means including a tubular coil support member, attached to the free end of the pendulous arm, the longitudinal axis of the tubular coil support member being substantially perpendicular to the longitudinal physical axis of the pendulous arm, said tubular coil support member having a web integral therewith and substantially perpendicular to the longitudinal axis of the tubular coil support member, said web having a plurality of radially equally spaced openings of circular segmental form therethrough, a pair of restoring coils fitted to the tubular coil support member, coaxially therewith, and a magnetic isolator of hollow cylindrical configuration fixedly mounted in said first cavity substantially co-axially within the restoring coils and circumscribing said stator structure and movable coil, said magnetic isolator having a plurality of legs integral therewith, the legs being radially aligned with the openings through the web of the tubular coil support member, each of the legs being of circular segmental cross-section, said legs being substantially parallel to the longitudinal axis of the tubular coil support member, said magnetic isolator being adapted to shield the signal voltage generating means, attached to the free end of the pendulous arm, from any stray magnetic fields set up by the current through the restoring coils.

References Cited in the file of this patent

UNITED STATES PATENTS

| | | |
|---|---|---|
| 2,552,722 | King | May 15, 1951 |
| 2,768,359 | Side | Oct. 23, 1956 |
| 2,883,176 | Bernstein | Apr. 21, 1959 |
| 2,985,021 | Lewis et al. | May 23, 1961 |
| 3,078,721 | Sawyer | Feb. 26, 1963 |

FOREIGN PATENTS

| | | |
|---|---|---|
| 159,078 | Sweden | June 4, 1957 |